March 5, 1929.
C. T. McGILL
1,704,051
SANITARY BASE EXCHANGE WATER SOFTENER
Filed Aug. 14, 1926
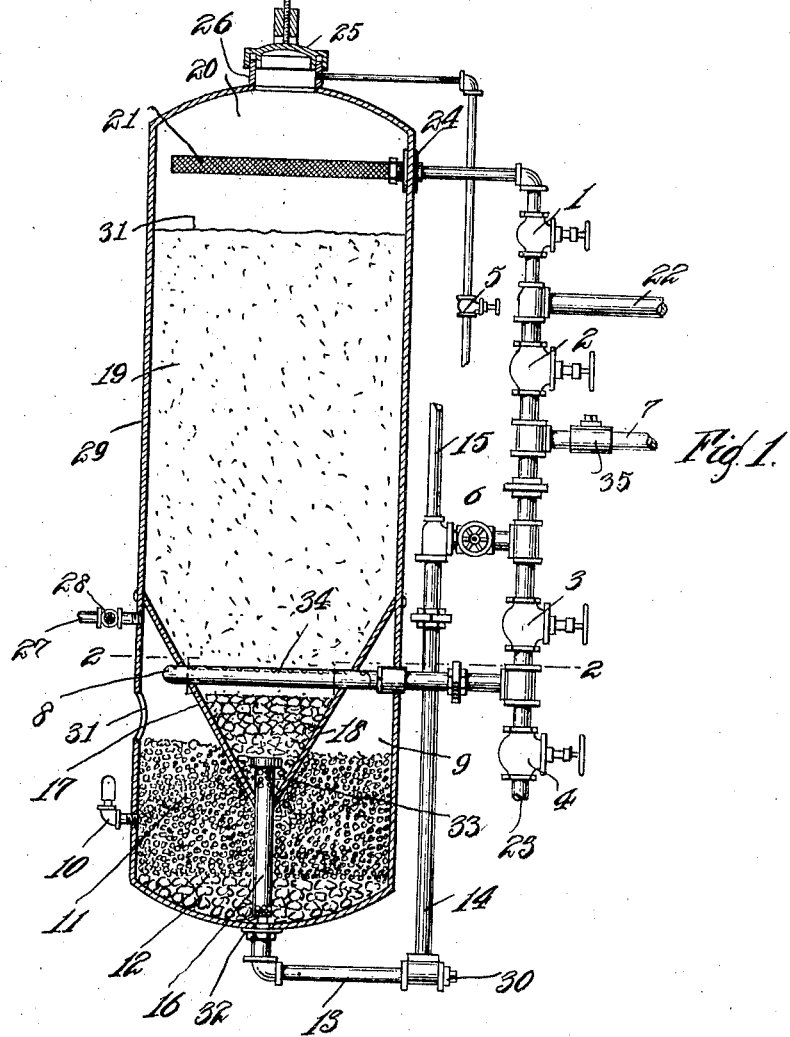
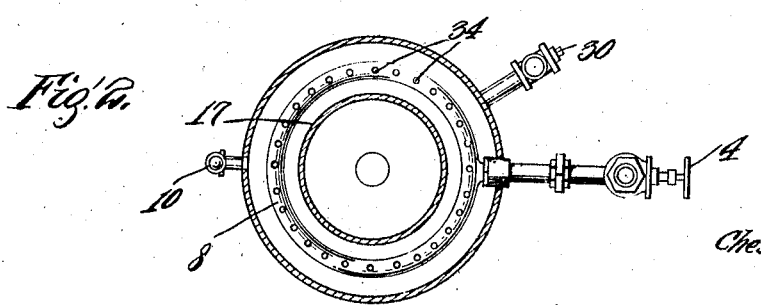
Inventor
Chester T. McGill.
By Mason Fenwick Lawrence,
Attorney Patented Mar. 5, 1929.

1,704,051

UNITED STATES PATENT OFFICE.

CHESTER T. McGILL, OF ELGIN, ILLINOIS, ASSIGNOR TO ELGIN SOFTENER CORPORATION, OF ELGIN, ILLINOIS, A CORPORATION OF ILLINOIS.

SANITARY BASE-EXCHANGE WATER SOFTENER.

Application filed August 14, 1926. Serial No. 129,190.

This invention relates to improvements in base exchange water softeners particularly to improvements in a sanitary softener.

An object of this invention is to provide a sanitary water softener which will function to rectify the raw water supply for household and industrial use by means of aerating, filtering and softening.

A further object of this invention is to provide a softener of a rectifying type wherein means are provided for keeping the filtering operations thoroughly sanitary and eliminating the accumulation of impurities, that, if allowed to remain in crevices or portions of the rectifier, would breed bacteria and contaminate the water rather than purify it.

Other objects of this invention include filtering under pressure of the suspended solids that are naturally in the water and those brought about by the aerating, softening and removing of calcium and magnesium, the filtering and delivery of unsoftened water for drinking or other purposes, the pocketing and trapping of air, and eliminating air from reaching the bottom of the supply element leading to the base exchange mineral, the supplying of air in a continuous or intermediate flow into the aerating chamber, backwashing of filtering material without disturbing the softening section, also the provision for backwashing filter-material with steam or hot water, elimination of air from raw water supply before it enters the bed of base exchange mineral, the elimination of precipitation of iron and suspended solids from raw water before it enters base exchange mineral, removal of air, scum or sediment that may have accumulated from the highest point of equipment.

A further object of this invention is to provide a means for cleaning the screen through which the softened water passes.

Other objects of this invention will appear in the following detailed description of the device and in the disclosure of the single sheet of drawings, which is herewith made a part of this application.

In the drawings:

Fig. 1 illustrates a vertical sectional view of the base exchange water softener disclosing its various parts in assembled relationship.

Fig. 2 represents a sectional view of Fig. 1 taken along line 2—2.

This invention provides a device wherein in operation valves 1 and 3 are open. Valves 2, 4, 5 and 6 remain closed. The raw water enters at 7, passes through valve 3 and is distributed through ring 8, into an air chamber 9, the water discharging upwardly through fine perforations or holes in the distributing ring 8. This allows the water to spray down through the air which is under pressure bringing about the oxidation of the iron carried in the water.

The iron then becomes insoluble and is precipitated. As the water passes downward into the filter bed, the filter serves as a means for removing the precipitated iron together with the suspended solids in the water. It is apparent that in cases where air is supplied to the chamber 9, the entire portion of the space above the filtering material will be filled with air, also that portion of the filtering material down to the air vent 10.

When air is supplied sufficiently to lower the water down to the outlet leading to the air vent 10, the air passes out at this point thereby maintaining a water level in the filtering bed at the point level with the air trap. This air may be supplied through valve 28 and air line 27 continually or intermittently, depending upon the need for changing of such air. It will be noted that in some instances there will be no need for supplying air through valve 28 and connection 27 as there will be enough air compressed in the tank to provide the amount of air needed to supply sufficient air in chamber 9 to bring about the oxidation of the iron in the raw water. This is especially true in small domestic softeners handling water containing a small amount of iron.

The water then passes to the filter bed where in some instances the top portion of the filter bed 11 will extend into the air region, while the bottom portion of the filter bed 11 and the coarse gravel 12 will always be submerged in water. The water to be softened passes through the coarse gravel 12 into the connecting element 16, distributed in the bottom portion of the funnel 17. This water then passes through coarse exchange mineral 18 which lends itself to distributing of the water into the finer exchange mineral 19. As the water flows upward into the exchange mineral and through gradually increasing areas of the cone shaped body, the flow rate is gradually decreased so giving an even rise and distribution of the water through the mass of exchange mineral.

When the soft water is pulled at a fast rate of speed, it leaves the base exchange mineral near the center thereby causing replacing or changing of fine base exchange mineral 19.

At the bottom of the funnel 17, the base exchange mineral in the center is lifted up while the exchange mineral along the edge gradually gravitates down to the coarse exchange mineral 18 and in this way it keeps the mineral active and lends itself to a continual changing of position and grading of the mineral which lends itself in turn to high efficiency due to eliminating of channelling, packing and other undesirable features.

In this construction it will be noted that the usual free board space has been eliminated due to the following reasons: In operation the mineral is never compressed or packed by downward flow of water at a high rate of speed. Also the provision of the filter cloth strainer 21 eliminates the fines from being carried into the soft water supply line 22. The portion of water required for household or industrial purposes that is not to be softened, will not be passed into connecting element 16, but leaves the bottom of the tank 29 through pipe line 13 and 14 into the discharge line 15 for filtered water.

It will be noted that the rate of flow of softened water will be reduced to a regulated number of gallons per minute as well as the discharge filtered unsoftened water will be regulated as to the rate of flow. However, the raw water supply line leading to the distributing ring 8 as well as the backwashing line through valves 4 and 6, lines 13, 14 and 23, are of a larger size than the lines which discharge the softened water and the filtered water. A plug 30 is provided in the T between lines 13 and 14 for the purpose of connecting a steam or hot water line or hose, if desired, for the purpose of thoroughly sterilizing the filtering material through backwashing process.

When backwashing with steam or hot water, valves 1, 3, 5 and 6 are closed, while valves 2 and 4 are opened. This maintains pressure on the upper portion of the softener which will eliminate hot water and steam readily finding its way into the base exchange mineral, but with valve 4 open, the hot water and steam leads into line 13 to the bottom of the filter of tank 29, then up to the coarse gravel 12 into the fine filtering material 11, hence into space 9, finding its way into the distributor ring 8 and through valve 4 to drain 23. This thoroughly cleans the filtering material and removes the precipitated matter without the necessity of taking the filtering material out of tank 29 for cleaning purposes. The filtering material is admitted through a hand-hole 31.

The construction above described provides a means of backwashing the filtering material while the softening portion is in operation without interfering with it whatsoever and it is intended by this invention that the filering material may be backwashed out between regenerating periods. This backwashing is for the purpose of removing suspended solids and precipitated iron thereby keeping the filtering material efficient, otherwise the filtering material would become contaminated with the solids, reducing the pressure of the water on the discharge lines and if not backwashed out, would in time carry the suspended and precipitated iron into the base exchange mineral 19 as well as into the filtered water discharge 15.

The elimination of the air from the water before it reaches the base exchange mineral, is a great advantage over previous constructions. When air gets into base exchange mineral it fills the pores of the mineral thereby preventing the water from readily passing through the mineral and reducing the capacity of the mineral as long as the air remains therein. Also the air that finds its way into the mineral has a tendency to entangle itself into the mineral changing the buoyancy of the mineral and when soft water is drawn rapidly any mineral that contains air has a tendency to leave the mineral bed and be carried into the soft water lines.

This invention provides means for removing the air from the raw water before it gets to the base exchange minerals by separating air from the raw water before it enters the base exchange mineral which enables the mineral to maintain its natural buoyancy.

During the softening period, the bed of exchange mineral will rise above its normal level 31 up to and above the fine mesh screen pipe 21 which prevents the waste of any mineral. This arrangement gives the softening section greater capacity, avoiding the wasteful freeboard space common to other constructions now in use. The grade of filtering material is determined by the amount of suspended matter and iron contained in the raw water. This determination is based upon mineral and sanitary analysis of the water, experiments, practical experience acquired in the installation and operation of plants treating similar waters.

In the process of regeneration, valves 1, 3 and 6 are closed. Valves 2, 4 and 5 are opened. Cap 25 is removed. As soon as enough water is drawn out of tank 29 to lower the water line in the salt space 20 to admit the amount of salt required to regenerate the mineral, the salt is admitted and cap 25 is replaced.

Valve 1 is opened wide and valve 4 regulated so as to discharge water at the rate of 1 or more gallons per minute depending upon the size of softener being regenerated. This process requires different lengths of time depending upon the exchange mineral used, but usually about 20 minutes is sufficient to regenerate mineral by releasing hardness and washing to the drain 23. When the hardness is removed from the mineral, the mineral absorbs the sodium in the usual way.

Valve 1 is then closed and valve 6 is opened. This allows the raw water to enter through pipe 13 into the bottom of tank 29. Valve 4 is then opened wide which flushes the filtering material out thoroughly. Valves 4 and 6 are then closed and valve 3 opened. The valve 5 is opened wide enough to discharge water usually at the rate of 1 to 3 gallons per minute on domestic softeners as this brings the water into air space 9, passes down through the filtering material, up through connecting element 16, up through the base exchange mineral and out at the discharge 5.

When this water reaches the base exchange mineral it carries with it accumulation of sediment or scum that may find its way to the top portion of the softener or be added with the salt. This scum or sediment is removed through discharge line 5 when washing the material upward. As soon as the water becomes soft and clear at valve 5, the softener is ready to be put into operation. Valve 5 is closed, valve 2 is closed and valve 1 is opened and the filter and softener is again in operation.

When admitting salt in regenerating, should the screen 21 show the need of a thorough, cleansing, the operator may unscrew the screen 21 with a wrench at 24 for the purpose of taking screen out of the softener tank and thoroughly scalding and cleaning same. Should the screen 21 not need scalding or cleansing, it can be easily reached and brushed for the removing of any sediment or fine material.

This invention provides a base exchange water softener having among the improvements a means for aerating the raw water before it passes through the lower portion of fine material 11 and the coarse filtering material 12. Space 9 together with the top portion of the fine mineral 11 will consist of compressed air, and as the water enters the raw water supply element 8 it may be distributed in any satisfactory manner of spraying the water in the air chamber thereby producing the oxidation of the iron and bringing about a ready precipitation of the iron. The aerated raw water will find its way down through the fine filtering material 11 and the coarser filtering material 12 into a connecting element, or line 16, through perforations 32 or otherwise and upwardly through perforations 33 into the lower portion of the funnel shaped element 17 located within the tank 29.

It is preferred in this invention to locate in the lower portion of the funnel 17 a coarse type of base exchange mineral as designated at 18, into this coarse mineral is adapted to flow the aerated filtered water. The funnel or cone shaped construction of the plate 17 results in the water passing upwardly at a decreasing rate of flow thereby causing the filtered aerated water to be distributed equally into the fine exchange mineral. It is to be understood that the shape of the plate 17 may be of any suitable construction which will produce the advantages above described and produce the most even distribution of the aerated filtered water.

The raw water element 8 may be of any suitable type, preferably having perforations 34 therein, for spraying the raw water upwardly within the aerating chambers 9. The line 8 may be of any suitable type in form of construction for accomplishing this purpose.

A check valve 35 is located in the raw water supply line for the purpose of preventing a back pressure from the air chamber 9 in case of a reduced pressure from the main water supply 7.

It becomes apparent that this invention provides a device wherein the base exchange mineral is not supported by means of a perforated plate or filtering material. It is entirely supported by a suitably formed plate having no perforations.

Furthermore, the base exchange mineral in this invention is not allowed to pack or compress due to the fact that the mineral is kept free from sediment, scum and iron for reasons above described and in the natural flow of the water the mineral gradually changes location thereby breaking up any channeling.

In regenerating the base exchange mineral, it will be noted that the salt is admitted at the top, the cap is unfastened, then the raw water is admitted through valve 1 and screen 21; this places full pressure in the tank 29. Valve 4 is opened just wide enough to discharge water to drain 23 at the rate of one gallon or more per minute depending on the size of the softener being regenerated. This does not allow sufficient travel of water down through the mineral during regenerating periods to compact the mineral.

In flushing out the filtering materials 11 and 12, it will be noted that no water passes through the base exchange mineral at the time that flushing out of filtering materials with the exception of water that flows upwardly through the base exchange mineral, that is in the upflow arrangement of filtering of the softener.

It will be understood in this connection that the invention as described and claimed herein may be utilized for either the upflow or downflow method without in any way affecting the merits of this case.

What I claim is:

1. In a base exchange water softener comprising a tank, filtering material, base exchange mineral and raw water supply line, means for aerating the raw water consisting of an air chamber formed within the tank adapted to receive the raw water.

2. In a base exchange water softener comprising a tank, filtering material, base exchange mineral and raw water supply line, means for aerating the raw water consisting of an air chamber formed within the tank adapted to receive the raw water, and means for admitting air to the air chamber under pressure.

3. In a base exchange water softener comprising a tank, filtering material, base exchange mineral and raw water supply line, means for aerating the raw water consisting of an air chamber formed within the tank adapted to receive the raw water, and means for admitting air to the air chamber under pressure, filtering material within the air chamber.

4. In a base exchange water softener comprising a tank, filtering material, base exchange mineral and raw water supply line, means for aerating the raw water consisting of an air chamber formed within the tank adapted to receive the raw water, and means for admitting air to the air chamber under pressure, filtering material within the air chamber, an air exhaust to the air chamber for the purpose of discharging air at a point above the filtered water discharge.

5. In a base exchange water softener comprising a tank, filtering material, base exchange mineral and raw water supply line, means for aerating the raw water within the tank, a non-perforated plate within the tank for supporting a substantial portion of the base exchange mineral.

6. In a base exchange water softener comprising a tank, filtering material, base exchange mineral and raw water supply line, means for aerating the raw water within the tank, a non-perforated plate within the tank for supporting a substantial portion of the base exchange mineral directly thereon.

7. In a base exchange water softener comprising a tank, filtering material, base exchange mineral and raw water supply line, means for aerating the raw water within the tank, a non-perforated plate within the tank for supporting a substantial portion of the base exchange mineral directly thereon, a connection leading from the filtering material for delivering aerated filtered water into the base exchange mineral through the supporting plate.

8. In a base exchange water softener comprising a tank, filtering material, base exchange mineral and raw water supply line, means for aerating the raw water within the tank, screen means for preventing the base exchange mineral from flowing into the soft water lines having a mesh finer than the base exchange mineral located within the tank.

9. In a base exchange water softener, comprising a tank, filtering material, base exchange mineral and raw water supply line, means for aerating the raw water, means for preventing the base exchange mineral from flowing into the soft water lines consisting of a suitable means having a mesh finer than the base exchange mineral located within the tank, and a surface blow-off line located at the top of the tank.

10. In a base exchange water softener, comprising a tank, filtering material, base exchange mineral and raw water supply line, means for aerating the raw water within the tank, and means for furnishing aerated softened and unsoftened filtered water.

11. In a base exchange water softener comprising a tank, filtering material, base exchange mineral and raw water supply line, means for aerating the raw water within the tank, means for backwashing the filtering material between regenerating periods while the softener is in operation and at the same time supplying soft water.

12. In a base exchange water softener comprising a tank, filtering material, base exchange mineral and raw water supply line, means for aerating the raw water within the tank, and means for suitably backwashing the filtering material with steam or hot water and at the same time backwashing the filtering material in such a manner that steam or hot water will be prevented from passing through the exchange mineral.

13. In a base exchange water softener comprising a tank, filtering material, base exchange mineral and raw water supply line, means for aerating the raw water within the tank, means for regenerating the base exchange mineral consisting of a fill nozzle for receiving the salt, thereby forming the brine solution within the tank.

In testimony whereof I affix my signature.

CHESTER T. McGILL.